United States Patent
Shah

(10) Patent No.: US 6,389,461 B1
(45) Date of Patent: May 14, 2002

(54) SYSTEM AND METHOD FOR SUPPLYING AND UPDATING INFORMATION FROM ONE OR MORE WORKS TO ONE OR MORE REMOTE USER DEVICES IN A READILY ACCESSIBLE FORM, AND REMOTE USER DEVICE FOR USE THEREIN

(75) Inventor: Sandeep Shah, Northboro, MA (US)

(73) Assignee: Skyscape, Inc, Hudson, MA (US)

( * ) Notice: Subject to any disclaimer, the term of this patent is extended or adjusted under 35 U.S.C. 154(b) by 0 days.

(21) Appl. No.: 09/540,228

(22) Filed: Mar. 31, 2000

(51) Int. Cl.[7] ............................................. G06F 15/16
(52) U.S. Cl. ...................................... 709/217; 219/249
(58) Field of Search ................................ 709/217, 219, 709/247

(56) References Cited

U.S. PATENT DOCUMENTS

| | | | | |
|---|---|---|---|---|
| 5,864,871 A | * | 1/1999 | Kitain et al. ................. | 707/104 |
| 6,047,327 A | * | 4/2000 | Tso et al. .................... | 709/232 |
| 6,154,213 A | * | 11/2000 | Rennison et al. ........... | 345/356 |
| 6,240,451 B1 | * | 5/2001 | Campbell et al. ........... | 709/224 |

OTHER PUBLICATIONS

Printout of WO 2001US1753 (US. Ser. No. 09/487,932), 22 pages.*
Printout of WO 2001US1644, 25 pages.*
Printout of WPI Acc No.:2001–432320/200146, one page.*
"K2 Announces Drug–To–Drug Interactions Analyzer for Palm Connected Organizers; Apothesarium is the First product of Its Kind on the Popular Palm Computing Platform", Business Wire, p 1199, Jul. 28, 99.*

"Easier Access to Complex Data Via Mobile Devices—MVION's Mobile Navigator Maps Information to An XML Server", InformationWeek 133, one page.*

* cited by examiner

Primary Examiner—Krisna Lim
(74) Attorney, Agent, or Firm—Richard A. Jordan

(57) ABSTRACT

An information supply and update system includes abase subsystem and one or more remote user devices. The remote user devices are conveniently handheld devices such as personal digital assitants, cellular telephones, smart phones, paging devices and the like that can receive, store and process information that they receive from the base subsystem. The base subsystem is configured to receive structured information directed to one or more topics, each topic including one or more sections, compress the information topic by typic, and provide the compressed topic information to the remote user devices. The remote user devices are configured receive and store the compressed topic information from the base subsystem. A user's remote user device is further configured to, in response to a request from a user identifying a particular section, enable the information from the section to be displayed on a display. The display is further configured to display section identification indicia, such as section buttons, which the user can actuate, with the user's remote user device enabling the section associated with the actuated section button to be displayed, thereby allowing for easy navigation through the section. A user can also enter information into the remote user device which can be stored thereon and/or transmitted to the base subsystem for storage. The information provided by the base subsystem to a remote user device can be provided at the base station's own instance, or at the request of the remote user device, and can include updates of previously-provided information as well as other information, including information retrieved over, for example, a network connected thereto as the result of a search.

32 Claims, 4 Drawing Sheets

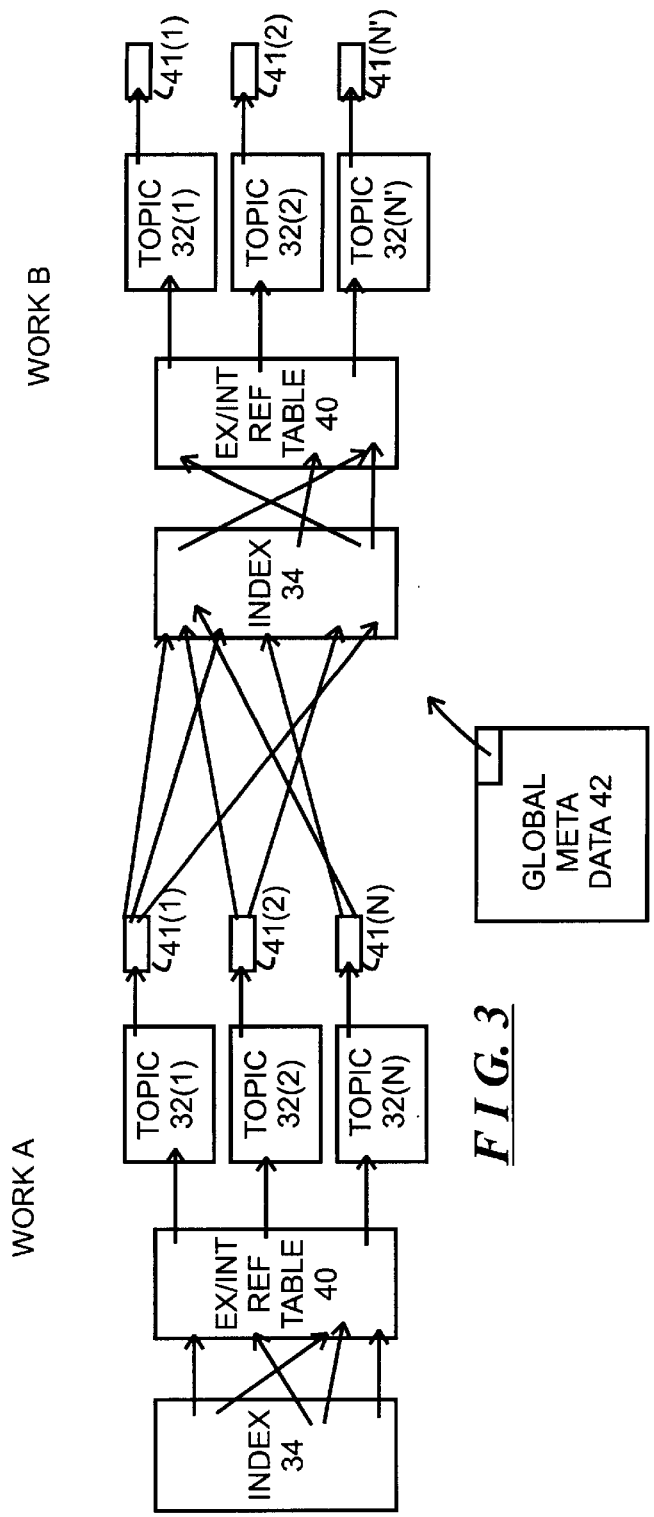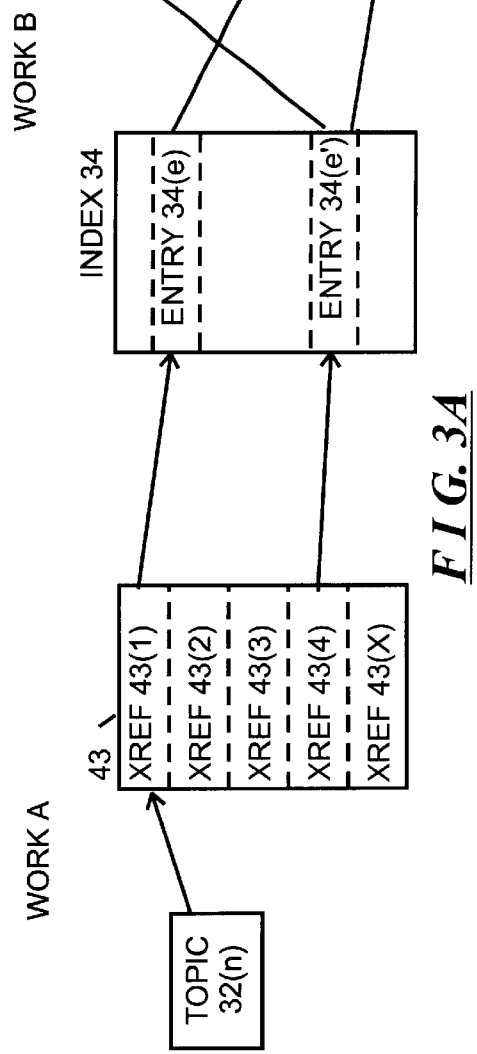

SYSTEM AND METHOD FOR SUPPLYING AND UPDATING INFORMATION FROM ONE OR MORE WORKS TO ONE OR MORE REMOTE USER DEVICES IN A READILY ACCESSIBLE FORM, AND REMOTE USER DEVICE FOR USE THEREIN

FIELD OF THE INVENTION

The invention relates generally to the field of systems and methods for providing information from one or more works to one or more remote locations in a form that is readily accessible to

BACKGROUND OF THE INVENTION

Complex information is used in a number of fields. Heretofore, such information has been provided printed in book form. This can result in a number of problems, particular when a user may wish to access information in a number of books concurrently. Typically, each work is indexing separately, and cross-referencing as among a number of works can typically be difficult, particularly when one needs to use information on-site. In addition, it is often difficult to ensure that the information is satisfactorily maintained in updated form Although information from individual works can often be accessed in electronic form, such as through a personal computer or laptop computer, typically such a computer are difficult to carry and use, and are also relatively expensive. In addition, although updating information as maintained on a computer may be easier than if the information is simply maintained in book (printed) form, such updates typically require a network administrator to ensure that the information has been provided to a particular computer in a timely basis.

SUMMARY OF THE INVENTION

The invention provides a new and improved system and method for supplying and updating information from one or more works to one or more remote user devices in a readily accessible form, and remote user device for use therein.

In brief summary, the invention provides an information supply and update system including a base subsystem and one or more remote user devices. The remote user devices are conveniently handheld devices such as personal digital assitants, cellular telephones, smart phones, paging devices and the like that can receive, store and process information that they receive from the base subsystem. The base subsystem is configured to receive structured information directed to one or more topics, each topic including one or more sections, compress the information topic by typic, and provide the compressed topic information to the remote user devices. The remote user devices are configured receive and store the compressed topic information from the base subsystem. A user's remote user device is further configured to, in response to a request from a user identifying a particular section, enable the information from the section to be displayed on a display. The display is further configured to display section identification indicia, such as section buttons, which the user can actuate, with the user's remote user device enabling the section associated with the actuated section button to be displayed, thereby allowing for easy navigation through the section.

Additional features of embodiments of the invention include the fact that the remote user devices also include a user input through which a user can also enter information into the remote user device which can be stored thereon and/or transmitted to the base subsystem for storage. The information input by a user can be associated with a topic as an annotation and stored for later display at the user's request when, for example, the topic associated with the annotation is being displayed. In addition, the information provided by the base subsystem to a remote user device can be provided at the base station's own instance, or at the request of the remote user device, and can include updates of previously-provided information as well as other information, including information retrieved over, for example, a network connected thereto as the result of a search. Furthermore, the remote user device is provided with an interface which permit information from selected topic or sections thereof to be printed, and to be facsimileed, Emailed or otherwise transferred to another location.

Further features of embodiments of the invention include the fact that information from different works can be cross-referenced, using indices generated for each work, so that, when a topic from one work is being displayed, the user can determine whether another work has topics that may be related thereto and, if so, readily access the related works using the cross references. In addition, a work can include "permeable content," that, when actuated by a user, the user providing values for input parameters as necessary, can enable the remote user device to process a target program using the parameter values as provided to generate an output that can be displayed; the permeable content can take the form of, for example, and equation that is processed in relation to input values to generate one or more output value that can be provided to the operator. This will simplify solving an equation contained in a work for certain input values as provided by the user, without requiring the user to try to utilize the equation elsewhere.

In one embodiment, in which a remote user device is used by a physician, information entereed by a physician can also include patient information, including, for example, information as to symptoms, diagnoses, and treatment regimens, including prescrptions for pharmaceutical products. Some or all of this information can be stored on the remote user device, and also transmitted to the base subsystem for storage thereon. In addition, the base subsystem can forward the prescription information to a pharmacy at which the prescription can be filled. The prescription information can also be printed locally, enabled by the remote user device. In both cases, the prescription information can include a bar code representing the prescription information, which can be scanned by a bar code reader at the pharmacy.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 and FIG. 3A schematically depict operations performed by the base subsystem in generating cross-reference information for use by the remote device in connection with accessing information in a plurality of works, and by a remote user device in connection with making use of the cross-reference information.

DETAILED DESCRIPTION OF AN ILLUSTRATIVE EMBODIMENT

Figure 1:
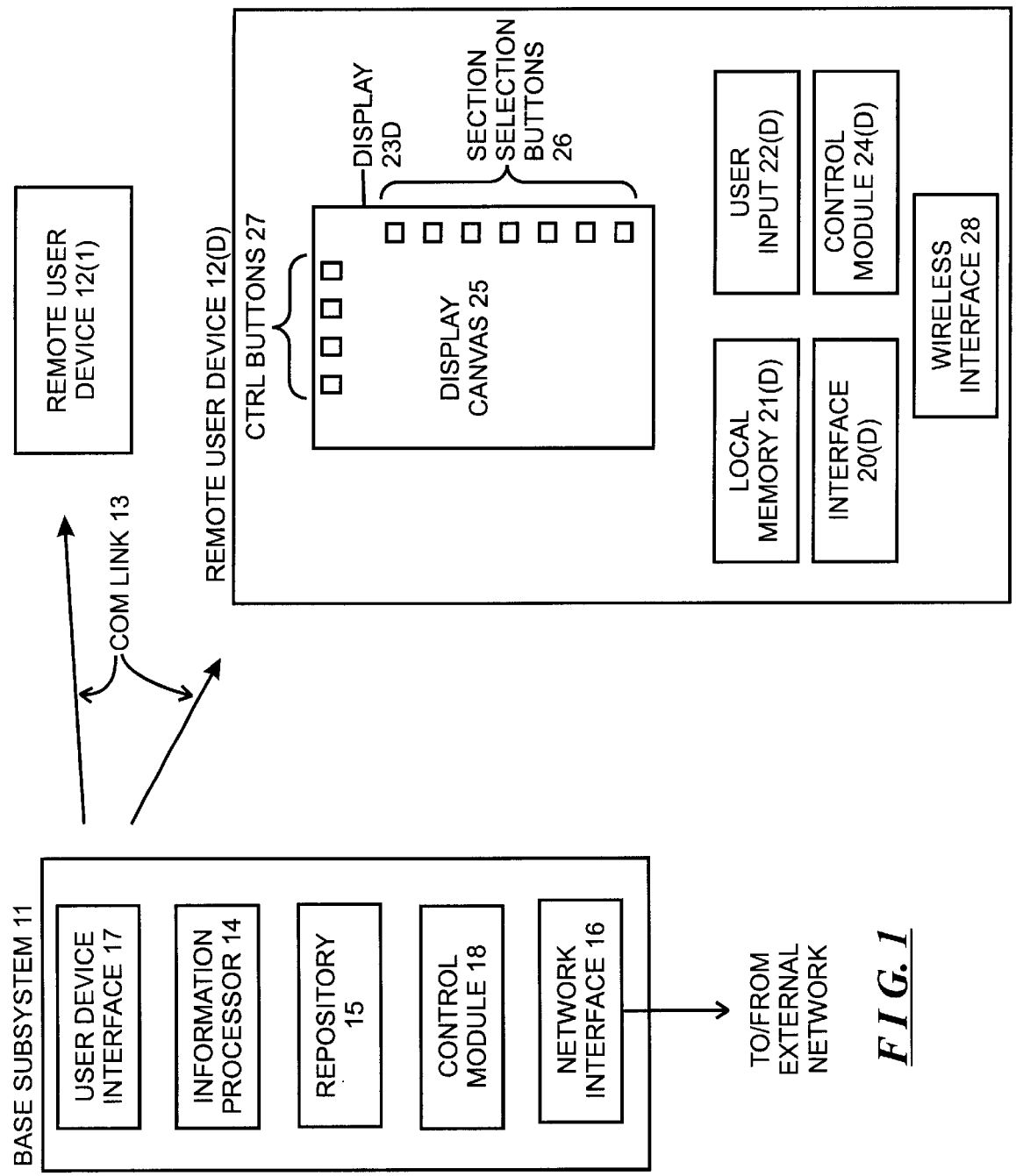
FIG. 1 schematically depicts an information supply and update system, constructed in accordance with the invention.

FIG. 1 depicts an information supply and update system 10 for, inter alia, supplying information to a user and updating the information as necessary, constructed in accordance with the invention. With reference to FIG. 1, the information supply and update system 10 includes a base subsystem 11 and one or more remote user devices 12(1) through 12(D) (generally identified by reference numeral 12(d)). The base subsystem 11 generally includes an information processor 14, an information repository 15, an external network connection 16, and a user device interface 17, all of which operate under control of a control module 18. The information processor 14 processes information from information sources to identify individual information items which may be displayed on a display of a respective remote user device 12(d), extracts table of contents and index information therefor, and compresses the individual information items and provides them through the user device interface 17 and over communication link 13 to the respective remote user devices. All of the remote user devices 12(d) may receive the same information, or, alternatively, entities who maintain respective ones of the remote user devices 12(d) may subscribe to respective ones of the information sources and, in that case, the base subsystem 11 may provide the remote user devices 12(d) with only information from the subscribed sources. The information may be provided over any form of a communication link, generally identified by reference numeral 13, which may comprise a wire, optical fiber connection, a wireless connection, or combination thereof, or any other arrangement by which information may be transferred between the base subsystem 11 and remote user devices 12(d).

In one embodiment, the remote user devices 12(d) are devices such as PDA's (personal digital assistants), paging devices, cellular telephones, smart phones, and/or any other types of devices which may receive information from a remote location, such as the base subsystem 11, and store the information for later display. Preferably, the remote user devices 12(d) Generally, in that embodiment, a remote user device 12(d) includes a link interface 20(d), a local memory 21(d), a display 22(d), and a user input 23(d), all operating under control of a control module 24(d). The link interface 20(d) allows the remote user device 12(d) to communicate with the base subsystem 11, receive information therefrom and provide information thereto, as will be described below. The link interface 20(d) generally stores the information received from the base subsystem 11 in the local memory 21(d). The user input 23(d) allows a user to provide user input, which may, for example, identify particular items of information which have been stored in the local store that are to be displayed. In that case, the control module 24(d) will enable the information to be retrieved and displayed on the display 23(d). The user input may be in the form of a keypad, a microphone, a touch screen, or other appropriate forms for receiving input from a user, or any combination of these.

In addition, in one embodiment, the information from each information source is generally in a structured format, with each information source including a plurality of topics, each related to a particular topic, with each topic having a plurality of sections. In that embodiment, all topics generally have sections directed to topics from a set of section associated with the work, although not all topics need have all of the sections from the set of sections. In that embodiment, when remote user device 12(d) displays the information from a section of a topic in the display canvas 25 of the display 22(d), a set of section selection buttons 26 are provided along the right side of the display canvas 25, and a set of control buttons 27 are provided along the top side of the display canvas. In one embodiment, the display 22(d) is in the form of a touchscreen, which can both display information and sense when a user touches the screen with, for example, a pointing device; in that case, if the user touches the screen with a pointing device at a button 26 or 27, thereby "actuating" the button, he or she can enable the remote user device 12(d) to perform an operation. For example, if the user actuates a appropriate one of control buttons 27, he or she can enable the remote user device 12(d) to perform any of a number of operations described herein, including, for example, displaying information, enabling information to be updated and annotated, and the like.

Each selection button 26 is associated with one of the sections, and a user can enable the remote user device to scroll to a particular section by clicking on or otherwise selecting the one of the section buttons 26 that is associated with the respective section. The series of section buttons may be identified by, for example, alphanumeric characters from a series, such as "A," "B," "C," . . . or "1," "2," "3," . . . , a mnemonic device such as the first letter of the section heading with which it is associated, such as, for example, "B," "U," "F," "G," . . . if the section headings are "Brand Name," "Use," "Forms" and "General." Since different information sources may have topics that contain different numbers of topics, the number of section buttons 26 that are provided may differ as among the different information sources.

As noted above, the information supply and update system 10 can enable the information provided to the remote user devices to be updated. This may be desirable if, for example, one or more topics of an information source is updated. In that case, the base subsystem 11, at the request of a remote user device, can transmit updated information to the remote user device 12(d). When a remote user device 12(d) receives the updated information, it can store it in its local memory 21(d) in place of the previous version of the information. As will be described below in greater detail, each topic provided to a remote user device 12(d) is associated with a respective version identifier, which the remote user device 12(d) also receives and stores with the respective topic. The remote user device 12(d) can periodically communicate with the base subsystem 11 to determine whether the base subsystem 11 has updated information that should be provided to the remote user device 12(d), and, if so, transmit the updated information to the remote user device 12(d). In that operation, the base subsystem can transmit, for respective topics for which it has updated information, an identifier for the topic and the associated version identifier, to the remote user device 12(d). The remote user device 12(d), in turn, can compare the version identifiers to the version identifiers for the respective topics which it has previously received. If the remote user device 12(d) determines that the version identifier for a topic that it has received from a base subsystem 11 indicates that the base subsystem 11 has a later version than the version that it has stored in its local memory 22, the remote user device 12(d)

can request that the later version be transmitted thereto. After the remote user device 12(*d*), and specifically the link interface 20(*d*), has received the updated information from the base subsystem 11, it can store the information in the local memory 21(*d*). In one embodiment, the user can provide preferences information to the remote user device 12(*d*) to specify which topics are to be checked for updates and how often the remote user device 12(*d*) is to check for updates for the specified topics, which the remote user device 12(*d*) can use to determine when to request updates. In addition or alternatively, a user may manually enable his or her remote user device 12(*d*) to check for updates of specified topics or all topics.

In addition to displaying information provided by the base subsystem 11, a user, using one of the remote user devices 12(*d*), can input information that will be transmitted to the base subsystem for storage in a repository 15 for later access by that remote user device 12(*d*) and/or by other remote user devices. In one embodiment, the information supply and update system 10 is used in connection with health care institutions, with the information sources comprising sources describing, for example, diseases, pharmaceutical products, and generally including information sources that may be helpful in diagnosing diseases and identifying possible remedies therefor. In addition, a remote user device 12(*d*) can receive and store patient information for a physician's patients, including, for each patient, the identifications of diagnoses that the physician has made for the patient and the identifications of pharmaceutical products that the physician has prescribed for the patient. In that embodiment, the user can enter the patient information through the user input 22(*d*), and, after entry, the patient information will be stored in the local memory 21(*d*). Thereafter, the remote user device 12(*d*) can transfer a copy of some or all of the patient information to the base subsystem 11 for storage in the repository 15. After the patient information has been transferred to the base subsystem 11, it may be retrieved by the same, or an authorized other, physician can also access some or all of the patient information using the same or another remote user device 12(*d*); in that case, the base subsystem 11 can transfer the patient information to the remote user device 12(*d*) through, for example, the user device interface 17. In addition, for pharmaceutical product prescriptions which have been transferred to the base subsystem 11, the base subsystem 11 can transmit over a network (not separately shown) through, for example, the network interface 16, the prescription to a pharmacy where it can be filled. In addition, some or all of the patient information can be forwarded over the network to a third party payer such as an insurance company, health maintenance organization, preferred provider organization, or the like, for billing purposes.

In addition to transmitting the prescription and patient information to the repository 15, the remote user device 12(*d*) can enable the information to be printed locally. Similarly, the remote user device 12(*d*) can enable that has been information received from the base subsystem 11 to be printed locally. As noted above, the remote user devices 12(*d*) are in the form of PDA's, paging devices, cellular telephones, smart phones, and so forth, and will preferably be provided with infrared or other wireless interface 28. If the wireless interface 28 is held in appropriate proximity to an appropriate interface on, for example, a printer (not shown), the remote user device 12(*d*) can transmit information to the printer, which, in turn can print the information in hardcopy form. In addition, for those remote user devices 12(*d*) in which the interface 20(*d*) provide connections to the public switched telephony network (PSTN), such as cellular telephones, or to a network such as the Internet, such information an be transmitted by facsimile, Email or otherwise to another location. It will be appreciated that the information to be printed, facsimileed, Emailed or otherwise transferred to another location may comprise an entire topic or portions thereof as selected by the user. In one embodiment, the prescription information that is printed, facsimileed, Emailed, etc., includes a bar code that can be read by a bar code reader at, for example, a pharmacy, with the data being stored on, for example, a computer. This can ensure that the prescription information is accurately stored on the computer, eliminate the necessity of entering the prescription information by hand, and perhaps help in automating the prescription filling process.

As noted above, the base subsystem 11 includes a network interface 16 for connecting it (that is, the base subsystem 11) to a network. The network can be any network such as the Internet, public switched telephony network (PSTN), or the like. The network may be used, as described above, to enable the base subsystem 11 to transfer prescription information to pharmacies and patient information to third party payers. In addition, the network may be used to enable the base subsystem to access information from sources (not separately shown) that are available over the network, sources on the World Wide Web, or other information sources that will be apparent to those skilled in the art. The base subsystem 11 can, through the network interface 16, search information sources available on the network for use in its operations. For example, the base subsystem 11, and, in particular, the information processor 14, can retrieve the information that is to be processed and distributed to the remote user devices 12(*d*) from the various publishers of the information over the network through the network interface 16.

In addition, the base subsystem 11 can, automatically and/or at a user's request, perform a search to locate and retrieve information relating to particular subjects, and provide the located information to the user's remote user device 12(*d*). Illustrative topics for searching may include, for example, a information relating to diagnoses which have been developed for a user's patients, pharmaceutical products that have been recently prescribed to a user's patients, or information on any other topics that a user may deem desirable to have. The user, using his or her remote user device 12(*d*), can enter indicia through the user input 22(*d*) which is transferred to the base subsystem 11 identifying the topic or topics to be searched. Alternatively or in addition, the user can, using, for example, his or her remote user device 12(*d*), establish preferences with either the remote user device 12(*d*), the base subsystem 11, or both, to enable the base subsystem 11 to perform searches in connection with, for example, patient information that has been recently entered into the user's remote user device 12(*d*), uploaded thereby and/or by other remote user devices 12(*d*) to the base subsystem 11, and the like.

In one embodiment, in addition to the information as described above, the information supply and update system 10 can provide the remote user devices 12(*d*) with information as to requirements of various insurance, health maintenance organization, or other third party payer, for patients whose records are stored in the respective remote user devices 12(*d*). The physician can use this information when, for example, determining which of several pharmaceutical products, all which may be useful in treating a disease, to prescribe for a patient if the third party payer will pay for some pharmaceutical products and not others.

In addition to information provided by the base subsystem 11, a remote user device 12(*d*) can receive and store annotation information items input by a user and associate each with respective ones of the information sections. An annotation information item may be, for example, in text form entered through a user input 22(d) in the form of a keypad, in digitized sound form entered through a user input 22(d) in the form of a microphone, or other forms, such as image form, provided through appropriate forms of user inputs.

Figure 4:
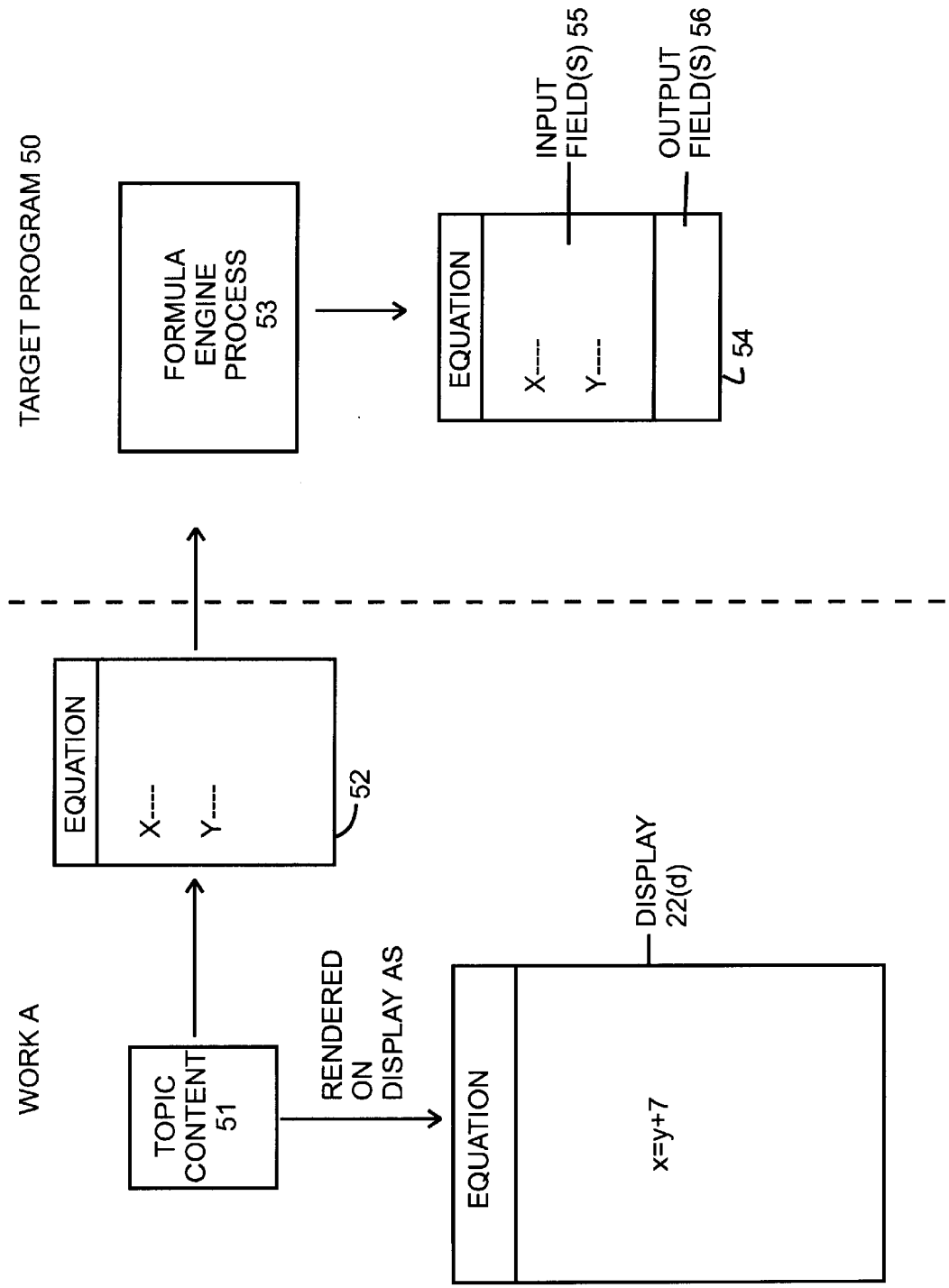
FIG. 4 schematically depicts operations performed by the remote user device in connection a permeable content arrangement to facilitate computation in relation to information provided by the base subsystem and/or a user.

Each of these will be described in further detail in connection with FIGS. 2 through 4.

Figure 2:
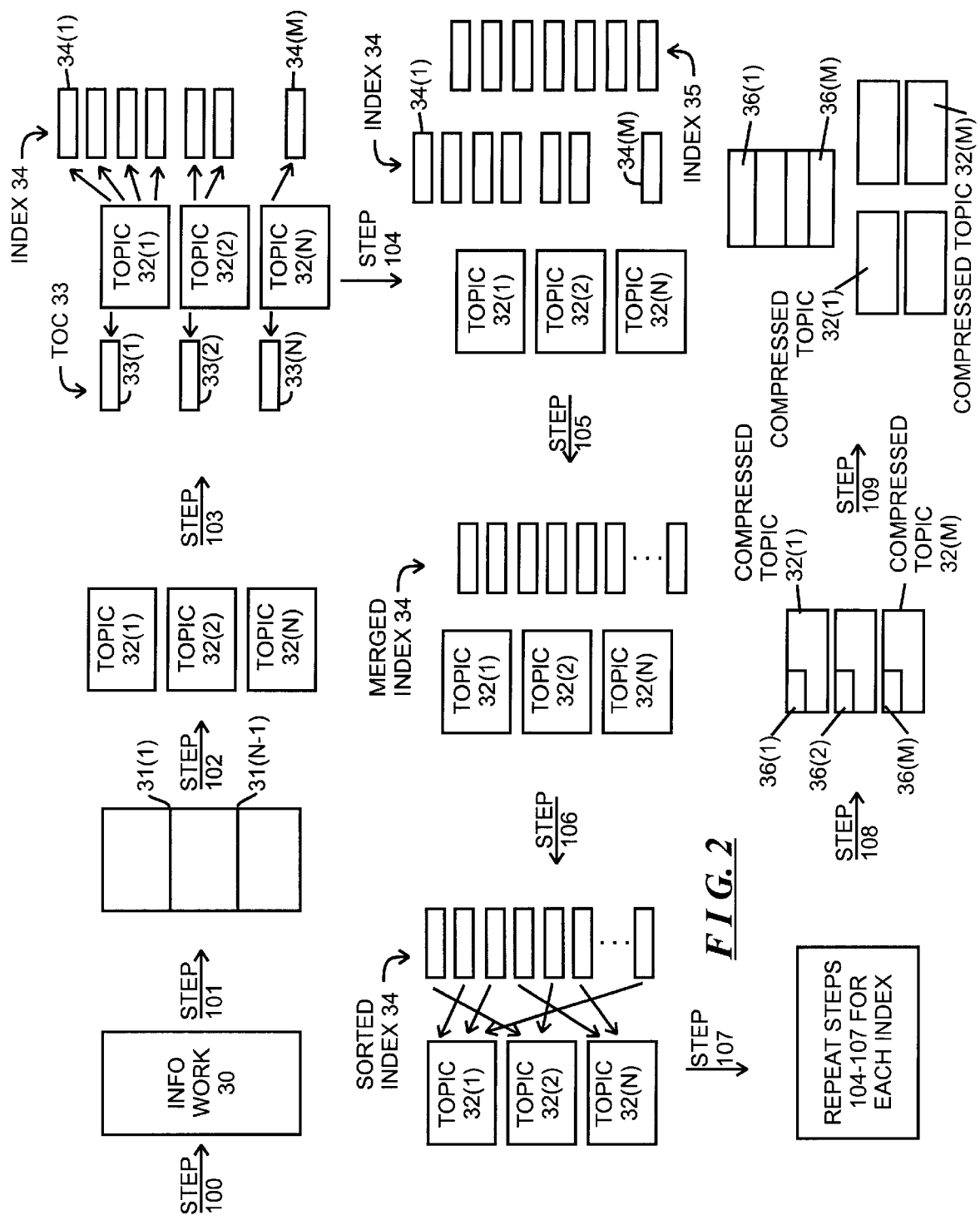
FIG. 2 depicts operations performed by a base subsystem in connection with processing of information to be provided by a base subsystem in the information supply and update system to a remote user devices, and structures use by the base subsystem in processing the information.

FIG. 2 schematically depicts operations performed by the information processor 14 in connection with processing and organizing the information that to be provided by the information storage and display system 10 to the remote user devices 12(d). With reference to FIG. 2, the information processor 14 initially receives an information "work" to be provided to the remote user devices, identified by reference numeral 30 (step 100). The information work may be a book, monograph, or other form as provided by, for example, an author or publisher. The work 30 is preferably in digital form, and may be obtained by, for example, scanning a printed version of the work, obtained in electronic form over the network through network interface 16, retrieved locally from an electronic or magnetic storage device through an appropriate retrieval device, or any other mechanism for receiving the work. After receiving the work, the information processor identifies informational boundaries 31(1) through 31(N–1) (generally identified by reference numeral 31(n)) (step 101). The informational boundaries 31(n) represent, for example, the boundaries separating topics. In addition, in step 101, the information processor 14 and may also identify the sections (if any) that are contained within each topic. The informational boundaries 31(n) in turn identify information topics 32(1) through 32(N) (generally identified by reference numeral 32(n)) which are separated into individual topics (step 102). A table of contents 33 and index is then generated for the information 30 (step 103). The table of contents 33 includes a plurality of table of contents items 33(1) through 33(N) (generally identified by reference numeral 33(n)), with each information topic 32(n) being associated with a correspondingly-indexed table of contents item 33(n). The index 34 also includes a plurality of index entries 34(1) through 34(M) (generally identified by reference numeral 34(m)) and identifies the particular information topics associated with each index entry. Each entry 34(m) in the index 34 includes not only the textual index item, but also a pointer to each information topic 32(n) with which the index entry 34(m) is associated.

After the table of contents 33 and index 34 have been generated in step 103, the indices may be augmented with additional index entries generally identified by reference numeral 35 (step 104). The additional index items 35 are merged with the entries 34(m) (step 105) to form a unified index (in the following, the additional index entries 35 and the index entries generated in step 103 will generally be collectively referred to as index entries 34(m)), after which the index items 34(m) are sorted alphabetically (step 106). The information processing system can perform steps 100 through 106 for each piece of information 30 and merge index entries 34(m) generate a unitary index comprising index items comprising index entries 34(m) generated for all oft he pieces of information 30 (step 107). Thereafter, the information processing system encrypts and compresses each information topic 32(n) of each information piece 30 individually, using any convenient encryption and compression algorithm and identifies the version information as necessary (step 108).

The information processing system then generates a meta-data header 36(n) for each encrypted and compressed information topic 32(n) (step 109). The meta-data header 36(n) in one embodiment includes a version identifier field, an information attribute field and a size information field (not shown separately). The version identifier field contains a version identifier that, when the information topic is stored on the remote user device 12(d), will be used to determine whether the information topic 32(n) as stored in the remote user device 12(d) is, for example, the most recent version. The information attribute field receives an information attribute that uniquely identifies the information topic 32(n), and may be associated with the pointer(s) that are used in the index entries 34(m) which are associated with the respective information topic 32(n). The size information field receives a size value that identifies the size of the uncompressed and unencrypted information topic 32(n) with which the meta-data header 36(n) is associated.

A specific example will serve to assist in understanding the information processing system described above in connection with FIG. 2. In one embodiment, the information 30 is in the form of a work, preferably in electronic form, of pharmaceutical products. The work includes a topic associated with each pharmaceutical product, and includes, for each such product, sections identifying, for example, diseases for which the respective product may be useful, other pharmaceutical products with which the respective product should not be used, side effects, and the like. For such a work, the information processing system in step 101 will identify as boundaries 31(n) those which will divide the information 30 into topics 32(n), with each topic containing the information associated with a particular pharmaceutical product. The table of contents item 33(n) generated in step 103 for each topic 32(n) will correspond to the topic's topic heading, which, in turn, will essentially identify the pharmaceutical product described in the topic. The index entries 34(m) generated in step 103 for each topic 32(n) may include, for example, the diseases identified in the topic 32(n) for which the product associated with the respective topic 32(n) may be useful, the products with which the respective product should not be used, side effects, and the like. Each topic, as an information topic, will be compressed and encrypted in step 108, the meta-data header 35(n) will be generated as described above in connection with step 110.

In addition to generation of a unitary index 34 associated with the information 30, the information processor 14 in one embodiment provides a plurality of indices based on predetermined index schema. For example, associated with information 30 relating to pharmaceutical products, it may be useful to have separate indices according to schemas by generic product name 34(G), trademark product name 34(T), therapeutic indications 34(I), and the like. These separate indices may be in addition to a general index generated as described above. In addition in one embodiment, a user can enable the remote user devices 12(d) to establish a user-specified index 34(U) with index entries (not separately shown) as determined by the user.

Generally, the information processor 14 performs the operations described above on a "work-by-work" basis. In one embodiment, the information processing and supply system 10 provides information to the remote user devices 12(d) from works directed to topics including, as noted above, pharmaceutical product, disease symptom, and the like, with each work being directed to a separate topic. In that case, the information processor 14 will generate a separate index for each work, or separate sets of indices if a plurality of indices are generated for the respective works. In addition, the information processor 14 provides cross-referencing between works. In that case, a topic of a work can have associated therewith cross-references to other topics in the same work as well as to topics in other works. Cross-referencing will be described in connection with FIG. 3.

Generally the information processor generates cross-references for the various topics based on the indices generated as described above in connection with FIG. 2. Each topic of a work is associated with two identifiers, including an external identifier and an internal identifier. An external identifier is generally meaningful to a human user. If, for example, the work relates to drugs, the external identifier for each topic may correspond to the name or be a mnemonic of the drug, which may comprise, for example, the brand name, generic name, and the like, and are preferably derived from the indices for the respective works as described above. The internal identifier, on the other hand, is preferably a compact or concise pointer, such as a number, and the information processor provides an external/internal reference table 40 that provides the correspondence between the external and internal identifiers. In addition, each topic for which a cross-reference is to be provided includes, as part of its meta-data references, using the internal identifiers that have been associated with the respective topic. This cross-reference information, along with the external/internal reference table 40 are provided to the remote user devices 12(d). When the topic is being displayed by a remote user device 12(d), the user, by appropriate manipulation of the user input 23(d), can enable the remote user device 12(d) to display a list of cross-references which have been established for the topic. When that occurs, the control module 24(d) will use the external/internal reference table 40 to identify the external identifiers which correspond to the internal identifiers which are associated with the topic as indicated by the topic's meta-data, and enable those external references to be displayed in a pop-up list on the display 22(d). After the pop-up list has been displayed, the user may, also using the user input 23(d), select one of the external references on the displayed list. If the user selects an external reference from the list, the control module 24(d) will identify from the index of the work associated with the selected external reference the topic or topics that relate to the selected external reference and enable one such topic to be displayed. In one embodiment, if multiple topics of a work are associated with the selected external reference, the control module 24(d) will enable a pop-up list of identification indicia for the topics to be displayed and allow the user to select one topic for display.

More specifically, and with reference to FIG. 3, after the information processor 14 has generated an index 34 for the work, as described above in connection with FIG. 2, it associates each index entry 34(m) with one of a plurality of internal identifiers, and generates therefrom the external/internal reference table 40. The information processor 14 performs these operations for each work, and so, if it is processing multiple works, it will have a separate external/internal reference table 40 for each work, along with a separate index for each work. In addition, the information processor 14 will associate with each topic 32(n), in addition to the meta-data noted above, meta-data 41(n) comprising a list of entries 34(m) from the index that were associated with the topic 32(n). Further, the information processor will generate global meta-data 42 comprising a list of works that can be cross-referenced. All of this information, that is, the meta-data 41(n) and the global meta-data 42, will be provided to the remote user devices 12(d) along with the processed information as described above in connection with FIG. 2.

When a user wishes to access a cross-reference in relation to a topic 32(n) being displayed (reference FIG. 3A) on the display 22(d) of a remote user device 12(d) he or she is using, the control module 24(d) enables a pop-up list 43 to be displayed. The pop-up list lists the external references for the internal references that were associated with the topic 32(n) by the information processor 14. Each external reference, in turn, is associated with a work, which may comprise the work which includes the topic being displayed, or another work. In either case, if the user selects one of the external references from the pop-up list 43, the control module 24(d) identifies from the index of the work associated with the external reference the topic or topics which correspond to that external reference. If one topic is associated with the index entry, the control module will enable that topic to be displayed. On the other hand, if multiple topics are associated with the index entry, the control module 24(d) will enable a pop-up list, similar to list 43, to be displayed, to enable the user to select one of the topics to be displayed.

It will be appreciated that it is preferable for the control module 24(d) to also store a list of recently-displayed topics, so that if a user, after referencing a cross-references, wishes to back-track to a previously-displayed topic, he or she may enable that to be readily accomplished.

As noted above, the information supply and update system 10 can supply information which may be displayed to a user, and update the information as necessary. In addition, in one embodiment, the information supply and update system can enable information to be processed, in a manner which will be referred to as "permeable content." In that case, a topic 32(n) can include, for example, information which may be used in processing by, for example, a target program 50, under control of the control module 24(d), when enabled to do so by the user. For example, a topic 32(n) can include parameters that may be passed to the target program 50 when the user provides appropriate input through the user input 23(d). Alternatively, the topic 32(n) can include an appropriate screen representation as defined for the target of the permeable content, as will be apparent to those skilled in the art. In either case, after the user has provided the appropriate input, the control module 24(d) can enable the target program 50 to perform the required processing operations, using the parameters as provided by the topic 32(n) or the user. After the target program 50 has finished its processing operations, it can return the results of the processing for display in appropriate fields of the topic 32(n), or display the results itself. While the target program 50 is performing its process operations, it may do so in the background, such that the topic 32(n) remains on the display 22(d), or it may provide indicia itself to be displayed.

Permeable content will be described in more detail in connection with FIG. 4. With reference to FIG. 4, the topic 32(n) provides content 51 that is displayed by the display 22(d), including an equation 52 that may or may not have parameter values associated therewith. If the equation 52 does not have parameter values associated therewith, the topic 32(n) will preferably provide an appropriate screen representation as defined for the target program 50 of the permeable content that will allow the operator to provide values for the parameter values to be used in connection with the processing operations by the target program. Thereafter, the user can enable the parameters, and information as to the form of the equation if the form of the equation needs to be provided to the target program. The control module 24(d), in turn, will enable the target program to be initialized and provide the parameters and, if provided, form of the equation thereto, and enable it (that is, the target program 50) to start processing operations. The target progrm 50 will generally include a process 53 and appropriate data structure(s) 54, with the process 53 controlling the processing and the data structure(s) possibly including one or more input fields 55 for the input parameters and one or more output fields for output parameters. After the target program 50 has finished processing operations, the control module 24(d) can resume previous operations. Alternatively, if the control module 24(d) provides a multi-tasking operating environment, the control module 24(d) can interleave processing operations in connection with the target program 50 and the session 32(d) in a manner that will be apparent to those skilled in the art.

Continuing with the example of the use of the information supply and update system 10 in a medical environment, it will be appreciated that the use permeable content in this manner can be of assistance in, for example, medical diagnosis as well as prescription preparation. For example, a physician can enter as parameters values derived from a number of medical tests and enable the remote user device to perform a computation thereon to provide one or more values that may assist diagnosing a medical condition. Similarly, in connection with prescription preparation, a physician can enter as parameters values that may be useful in determining optimum amounts of pharmaceutical products to prescribe, dosages, and so forth.

In addition, although permeable content has been described in the context of an equation, it will be appreciated that it may be readily used in connection with an extensive algorithm.

It will be appreciated that the information supply and update system provides a number of advantages. In particular, it provides an arrangement whereby complex information can be regarding quite complex fields, such as, but not limited to, medicine, can be provided from a central location, such as the base subsystem, to a remote device, where the information can be used in connection with activities involved with the field, such as, but not limited to, diagnosing patients, maintaining of records, preparation of prescriptions for pharmaceutical and other products relevant to the discipline and patient, and the like. In addition, the invention provides an arrangement whereby information from a number of diverse works may be easily accessed and cross-referenced. The invention further provides an arrangement whereby information can easily be updated.

The invention further provides an arrangement whereby information provided by a user, such as a physician, can be transferred to a central location from which it can be accessed by a number of users, particularly authorized users where authorization may be necessary or desired. In addition, the information transferred to the central location helps the assimilation f information from the base subsystem 11 or other remote location for downloading to the respective remote user devices 12(d).

In addition, the invention provides an arrangement whereby which may perform sophisticated commutations, using a "target program 50" such as described above in connection with FIG. 4, which can relieve the user from having to resort to use of a separate device to solve the equation, which may not be readily available. In addition, this can relieve a user from entering an equation or algorithm into a separate device, which can lead to errors.

Although the information supply and update system has been described in connection with one field, namely, the medical field, it will be appreciated that it will similarly find use in connection with a number of fields and with a number of types of information. For example, will find use in connection with texts and reference works in a number of fields, including law, computer science, engineering, architecture, and the like. A system constructed in accordance with the invention may be useful, for example, in providing information regarding statutes, regulations, and cases to a trial lawyer while he is engage in trial. Such a system can also be useful in providing help information for a number of programming languages. It can also be useful in, for example, architecture and civil engineering, where a user may need to have access to architectural and engineering information on site.

In addition, although the information supply and update system has been described in connection with textual information, it will be appreciated that the system can be readily used with formulas and equations, tabular data, flowcharts, and template based data.

It will be appreciated that a remote user device 12(d) can receive and store a substantial amount of information from the base subsystem 11 as well as from its user. The user can also enable his or her remote user to delete previously-stored information, including individual sections, as he or she deems necessary or expedient, by, for example, appropriate input through the user input 22(d).

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An information supply system comprising a base subsystem and at least one remote user device:
  A. the base subsystem being configured to receive a structured information work directed to a plurality of topics, each topic including a plurality of sections, the base subsystem being further configured to compress the information topic by topic, and provide the compressed topic information to the at least one remote user device;
  B. the at least one remote user device being configured to
    (i) receive and store the compressed topic information from the base subsystem,
    (ii) in response to a request from a user to display information from a particular topic, display at least section selection information associated with the respective sections of the particular topic, and
    (iii) in response to a request from the user to display information from one of the sections identified by the section selection information, enable the information from the requested section of the respective topic to be displayed on the display.

2. An information supply system as defined in claim 1 in which the display is further configured to display actuable section identification indicia, the at least one remote user device, in response to actuation of the section identification associated with one of said sections, enabling said section to be displayed.

3. An information supply system as defined in claim 2 in which the display includes a touch screen, and in which the section identification indicia includes a pushbutton.

4. An information supply system as defined in claim 1 in which the at least one remote user device includes a user input through which a user can also enter user information into the remote user device.

5. An information supply system as defined in claim 4 in which the at least one remote user device includes a local memory and a control module, the control module being configured to enable the user information to be stored in said local memory.

6. An information supply system as defined in claim 5 in which at least one item of user information is associated with one of said topics, the control module being configured to, in response to a user request, enabling the at least one user information item to be displayed in relation to said one of said topics.

7. An information supply system as defined in claim 4 in which the at least one remote user device includes an information transfer interface configured to transfer information to said base subsystem and a control module, the control module being configured to enable the information transfer interface to transfer the user information to the base station.

8. An information supply system as defined in claim 4 in which the remote user interface includes a control module configured to generate indicia representative of the user information.

9. An information supply system as defined in claim 8 in which the indicia includes a bar code.

10. An information supply system as defined in claim 4 in which the user information is in textual form, the user input comprising a keypad.

11. An information supply system as defined in claim 4 in which the user information is in voice form, the user input comprising a microphone.

12. An information supply system as defined in claim 1 in which the remote user device includes an interface and a control module, the control module being configured to enable selected information from at least one topic be transferred through the interface to an external destination.

13. An information supply system as defined in claim 12 in which the interface is configured to provide the selected information in at least one of a printer, facsimile, or Email format.

14. An information supply system as defined in claim 1 in which the base station is configured to generate, along with the compressed topic information associated with an information work, an index, and provide the index to the at least one remote user device.

15. An information supply system as defined in claim 14 in which the remote user device includes a control module configured to enable said display to display said index, the user using said index to enter said user request.

16. An information supply system as defined in claim 14 in which

A. the base subsystem is configured to receive a plurality of structured information works, each directed to one or more topics, each topic including one or more sections, the base subsystem being further configured to generate a respective index for each work, compress the information topic by typic, use the indices to provide cross-reference information associated with respective ones of said topics to associate them with other topics, and provide the compressed topic information, indices and cross-reference information to the at least one remote user device; and B. the at least one remote user device being are configured receive and store the compressed topic information, indices and cross reference information from the base subsystem, and further configured to, in response to a request from a user identifying a particular section, enable the information from the section to be displayed on a display, the at least one remote user device further being configured to, in response to a user request, display cross-reference information associated with a respective topic and, in response to user selection of an item of said cross-reference information, enable topic information associated with the selected cross-reference information item to be displayed.

17. An information supply system as defined in claim 1 in which at least one topic includes permeable content, the remote user device further including a target program configured to, in response to a user request therefor, perform predetermined processing operations in connection with the permeable content.

18. An information supply system as defined in claim 17 in which said permeable content includes a mathematical equation, the target program being configured to solve the equation in relation to parameter values and perform predetermined operations in connection with the solution.

19. An information supply system as defined in claim 18 in which the parameter values are provided by the user.

20. An information supply system as defined in claim 18 in which the target program enables the solution to be displayed.

21. An information supply system as defined in claim 1 in which at least one topic is associated with a version identifier, the remote user device being configured to determine whether the base subsystem has available updated information for the at least one topic in relation to the version identifier.

22. An information supply system as defined in claim 21 in which the remote user device is further configured to, if it determines that the base subsystem has available updated information for the at least one topic, request that the updated information be provided thereto, the base subsystem being configured to, in response to an updated information provision request, provide the updated information to the remote user device.

23. A user device comprising:

A. an information store configured to store information, the information including at least one topic, the at least one topic including a plurality of sections, each section being associated with a section type;

B. a display configured to display indicia to a user, the display having two portions, including an information display portion and a navigation control portion;

C. a display control configured to enable information from the at least one topic to be displayed in said information display portion, and section selection indicia associated with the at least one topic to be displayed in said navigation control portion, the section selection information identifying respective sections of the at least one topic information for which is displayed in the information display portion; and D. a user input receiver configured to receive user input selecting a section, section selection information for which is displayed in the navigation control portion, the user input receiver enabling the display control to, in turn, enable information from the selected section to be displayed in the information display portion.

24. A user device as defined in claim 23 in which the information store is configured to store information including a plurality of topics, at least some of said topics each including a plurality of sections, the display control being further configured to enable section selection information identifying respective sections associated with the one of said topics from which information is being displayed in the information display portion.

25. A user information device as defined in claim 23 in which the section selection indicia comprises at least one actuable selection button configured to be displayed in said navigation control portion, each selection button being associated with one of said sections.

26. A user information device as defined in claim 25 in which the display is a touch-sensitive display for which the user can actuate the at least one actuable selection button by touching the selection button.

27. A user device comprising:
A. an information store configured to store information, the information including at least two works, each work having at least one topic;
B. a display configured to display indicia to a user;
C. a display control configured to enable the display to display
   (i) information from one of said topics of one of said works, or
   (ii) cross-reference information associated with the one of said topics that is being displayed, said cross-reference information identifying at least one topic in said other work that is cross-referenced to the one of said topics that is being displayed;
D. a user input receiver configured to receive user input, the user input comprising
   (i) cross-reference display enabling input indicia, in response to which the display control is configured to enables the display to display cross-reference information associated with the one of the topics that is being displayed, and
   (ii) information display enabling input indicia, in response to which the display control is configured to enable the display to display information from said at least one topic in said other of said works.

28. A user device as defined in claim 27 in which the cross-reference information is in the form of a list, the list including at least one entry including a cross-reference to the at least one topic in said other of said works.

29. A user device as defined in claim 28 in which the list is a pop-up list displayed on said display.

30. A user device as defined in claim 27 in which said other of said works includes a plurality of topics, the display control being configured to,
A. enable the display to display, in the cross-reference information displayed by the display, identification of selected ones of the plurality of topics in each of a plurality of entries in a list; and
B. in response to user input received by said user input receiver comprising information display enabling input indicia identifying one of said entries, enable the display to display information from the at least one topic associated with the one of said plurality of topics identified in the identified one of said entries.

31. A user device as defined in claim 30 in which at least one of the topics in said other of said works includes a plurality of sections, the display control being configured to
A. enable the display to display, in the cross-reference information displayed by the display, identification of one of said sections in an associated entry; and
B. in response to user input received by said user input receiver comprising information display enabling input indicia identifying said associated entry, enable the display to display information from the one of said sections.

32. A user device as defined in claim 27 in which
A. the information store being configured to store information including a plurality of works greater than two, each work having at least one topic;
B. the display control being configured to enable the display to display
   (i) in the cross-reference information, identification of at least one topic from selected ones of a plurality of said works, and
   (ii) in response to information display enabling input indicia received by said user input receiver identifying one of said topics, information from said identified one of said topics.

* * * * *